United States Patent [19]

Nakanishi et al.

[11] Patent Number: 5,300,607
[45] Date of Patent: Apr. 5, 1994

[54] METHOD FOR PREPARING SILICONE RESINS

[75] Inventors: Junji Nakanishi; Toshio Saruyama; Atsushi Togashi, all of Chiba, Japan

[73] Assignee: Dow Corning Toray Silicone Co., Ltd., Tokyo, Japan

[21] Appl. No.: 944,141

[22] Filed: Sep. 11, 1992

[30] Foreign Application Priority Data

Sep. 30, 1991 [JP] Japan .................................. 3-278226

[51] Int. Cl.$^5$ ............................................ C08G 77/06
[52] U.S. Cl. ......................................... 528/14; 528/18
[58] Field of Search ...................................... 528/14, 18

[56] References Cited

U.S. PATENT DOCUMENTS 3,846,358 11/1974 Roedel .................................. 260/185
4,399,266 8/1983 Matsumura et al. .................. 528/10

Primary Examiner—Melvyn I. Marquis
Attorney, Agent, or Firm—Robert Spector

[57] ABSTRACT

Silicone resins containing monorganosiloxane and diorganosiloxane units and exhibiting reproducible values of molecular weight and dispersity are prepared by condensing a mixture of hydrolyzed silanes, adjusting the solids content of the condensed resin and then subjecting the resultant product to a re-equilibration reaction in the presence of an alkali metal compound.

3 Claims, 1 Drawing Sheet

METHOD FOR PREPARING SILICONE RESINS

BACKGROUND OF THE INVENTION

1. Field of the Invention

This invention relates to a method for producing silicone resins. More specifically, the present invention relates to a method for producing silicone resins composed of difunctional siloxane units (D units) and trifunctional siloxane units (T units). The resins exhibit a low molecular weight dispersivity and a controlled molecular weight.

2. Background Information

Silicone resins that are liquid at room temperature or that have relatively low softening points are employed as electrically insulating varnishes, heat-resistant coatings, and sealants for semiconductor elements. These silicone resins are classified according to the particular combination of siloxane units that make up the resin. Examples of such resins are DT type resins composed of difunctional siloxane units (D unit) and trifunctional siloxane units (T unit), MQ type silicone resins composed of monofunctional siloxane units (M unit) and tetrafunctional siloxane units (Q unit), and DTQ silicone resins composed of difunctional siloxane units (D unit), trifunctional siloxane units (T unit), and tetrafunctional siloxane units (Q unit). Among these silicone resins the DT type are characterized by ease of formation of the cured film by crosslinking and by the excellent mechanical properties of the cured film.

The DT type of silicone resins are prepared by cohydrolysis of a organotrihalosilane and a diorganodihalosilane or the corresponding organotrialkoxysilane and diorganodialkoxysilane in water. The resultant hydrolysis product is then subjected to a condensation reaction. This method is described in Japanese Patent Application Laid Open [Kokai or Unexamined] Numbers 50-77500 [77,500/1975] and 57-40526 [40,526/1982]).

Because both the cohydrolysis and condensation reactions in this preparative method cause an increase in the molecular weight of the silicone resin, the molecular weight of the final resin cannot be controlled. In addition, a highly reproducible production of silicone resin with the same molecular weight is beyond the capability of this preparative scheme due to the different reactivities of the D-D, D-T, and T-T bonds in a silicone resin composed of difunctional siloxane units (D unit) and trifunctional siloxane units (T unit). Moreover, the silicone resin afforded by this preparative scheme is itself associated with certain problems. For example, due to its large molecular weight dispersivity, it has a broad glass transistion point and softening point. This characteristic limits the scope of application of the silicone resin.

The present invention resulted from extensive efforts directed at solving the aforementioned problems associated with DT type silicone resins.

One objective of the present invention is to provide a method for producing silicone resin composed of difunctional siloxane units (D unit) and trifunctional siloxane units (T unit) the final resin exhibits a low molecular weight dispersivity and a controlled reproducible molecular weight.

SUMMARY OF THE INVENTION

The objective of this invention can be achieved by condensing a mixture of hydrolyzed di- and trifunctional halosilanes, adjusting the solids content of the condensed resin and then subjecting the resultant mixture to a re-equilibration reaction in the presence of an alkali metal compound.

DETAILED DESCRIPTION OF THE INVENTION

Figure 1:
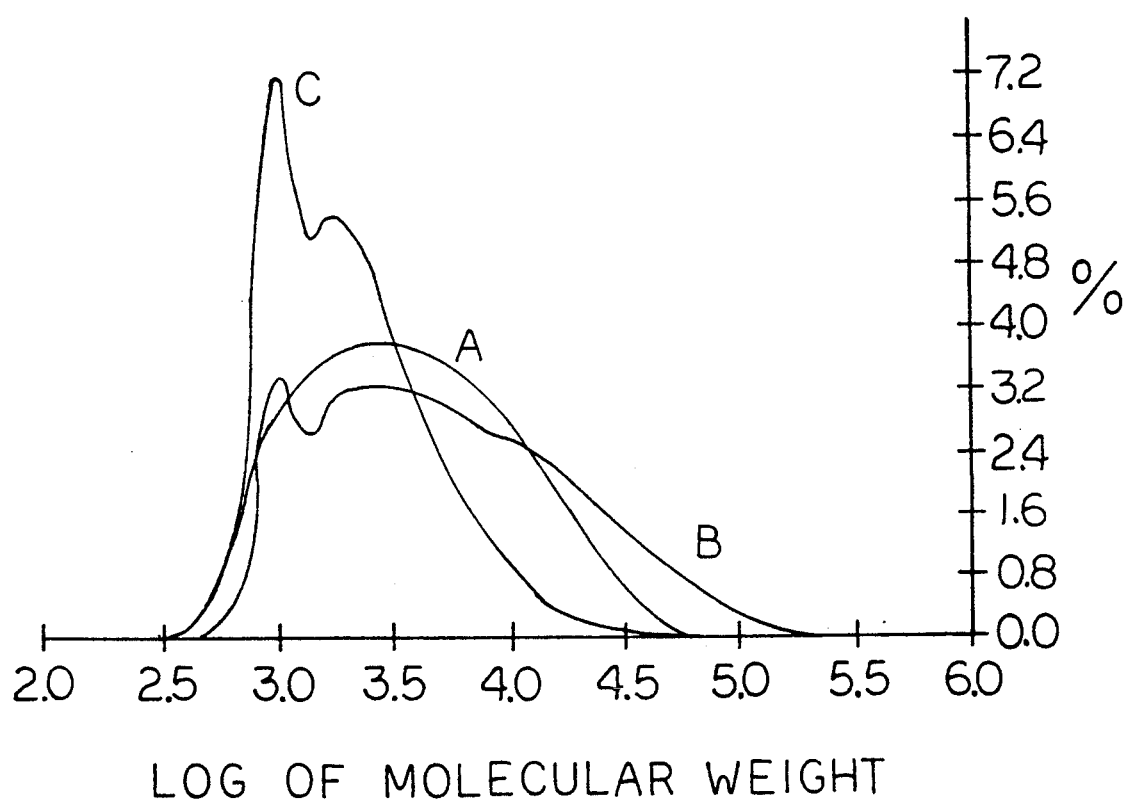
FIG. 1 is a plot of the molecular weight distributions of the samples identified as A, B, and C that were produced using the preparative methods described in Example 1 of the present specification.

The present invention provides a method for preparing an organosiloxane resin, said method comprising the sequential steps of (1) cohydrolyzing an organotrihalosilane of the general formula $$R^1SiX_3$$

and a diorganodihalosilane of the general formula $$R^2{}_2SiX_2$$

in an aqueous medium, (2) subjecting the resulting hydrolysis product to a condensation reaction, (3) subsequently adjusting the solids concentration in the reaction mixture within the range from 0.1 to 90 weight percent, based on the weight of said mixture, and (4) subjecting the resultant mixture to an alkali metal-catalyzed re-equilibration reaction.

In the formula for the silanes $R^1$ and each of the two $R^2$ substituents are individually selected from the group consisting of substituted and unsubstituted monovalent hydrocarbon radicals and X represents a halogen atom.

The preparative method of the present invention will be explained in greater detail below.

The organotrihalosilane and diorganohalosilane used in the hydrolysis step of the present method can be represented by the general formulae $R^1SiX_3$ and $R^2{}_2SiX_2$, respectively. The substituents represented by $R^1$ and each of the two $R^2$ substituents are identical or different substituted or unsubstituted monovalent hydrocarbon radicals. Examples of suitable hydrocarbon radicals include alkyl radicals such as methyl, ethyl, propyl, and butyl; alkenyl radicals such as vinyl, allyl, butenyl, and hexenyl; aryl radicals such as phenyl, tolyl, and xylyl; aralkyl radicals such as benzyl and phenethyl; and halogen-substituted alkyl radicals such as chloromethyl and 3,3,3-trifluoropropyl. X in the preceding formulae represents a halogen atom and is specifically exemplified by fluorine, chlorine, bromine, and iodine.

The preparation of silicone resins by the cohydrolysis of organotrihalosilane and diorganodihalosilane in water and condensation of the resultant hydrolysis product is known, and is described in Japanese Patent Application Laid-Open Numbers 50-77500 [77,500/1975] and 57-40526 [40,526/1982].

To explain the hydrolysis in greater detail, the organotrihalosilane and diorganodihalosilane are first cohydrolyzed in an aqueous medium, which is preferably a mixture of water and an organic solvent. The organotrihalosilane and diorganodihalosilane can, as necessary, be first dissolved in the organic solvent or the organic solvent can be added to the water prior to addition of the silanes. Operable organic solvents include but are not limited to aromatic hydrocarbons such as toluene and xylene, aliphatic hydrocarbons such as hexane and heptane, ethers such as tetrahydrofuran and dioxane, and ketones such as methyl ethyl ketone and methyl isobutyl ketone.

An alcohol such as methanol or ethanol is preferably dissolved in the water prior to addition of the halosilanes to facilitate the cohydrolysis reaction.

The initial phase of cohydrolysis can be conducted at room temperature. Following completion of the halosilane addition the reaction mixture is preferably heated above room temperature in order to bring the reaction to completion. It is generally advantageous to heat the hydrolysis reaction mixture at the reflux temperature of the organic solvent. The hydrogen chloride produced as a by-product of the cohydrolysis is preferably removed following completion of the cohydrolysis. This is preferably achieved by washing the cohydrolyzate with water or a weakly alkaline aqueous solution.

The product of the cohydrolysis reaction is then subjected to a condensation reaction. This procedure is generally known as "bodying", and involves condensation of the silanol groups in the hydrolysis product, generating water as a by-product. In accordance with the present method the condensation reaction is conducted in the presence of an acid or base catalyst, with basic catalysts being particularly preferred. The completion of the condensation reaction can be confirmed by cessation of the evolution of the water formed as a by-product of the reaction.

The characteristic feature of the present method is that following condensation of the hydrolysis product, the solids concentration of the resultant reaction mixture is adjusted and the resultant product is subjected to a re-equilibration reaction catalyzed by an alkali metal compound.

The final solids concentration must be one at which the silicone resin does not precipitate. A range of 0.1 to 90 weight % is generally preferred, the range of 5 to 70 weight % being particularly preferred.

When the solids concentration exceeds 90 weight %, the re-equilibration reaction becomes nonuniform and a highly reproducible silicone resin preparation is no longer possible. Lower solids concentrations are advantageous because they give a silicone resin product with a lower molecular weight and lower molecular weight dispersivity. However, solids concentrations below 0.1 weight % are uneconomical due to the associated decline in the yield of the silicone resin product.

By controlling the solids content of the resin solution following the condensation reaction it is possible to control or regulate both the molecular weight and molecular weight dispersivity of the silicone resin during the subsequent re-equilibration reaction. The solids concentration can be determined by distillation of the organic solvent and other volatile ingredients from the reaction mixture following completion of the condensation reaction.

Techniques for adjusting the solids concentration of the solubilized resin obtained from the condensation reaction include but are not limited to addition or removal of the organic solvent added during the cohydrolysis reaction.

The alkali metal catalyst used for the re-equilibration reaction is preferably a compound of potassium or cesium, and is specifically exemplified by the hydroxides, silanolates and alkoxides. Potassium hydroxide and cesium hydroxide are particularly preferred alkali metal catalysts.

At least 100 ppm alkali metal catalyst, based on the weight of the reaction mixture should be added to the reaction mixture.

The reaction temperature maintained during this reequilibration reaction is not specifically restricted, however the reflux temperature of the organic solvent is preferred. The time required to complete the re-equilibration will depend upon the particular reaction mixture, and is determined by periodic sampling and analysis of the reaction mixture to determine the molecular weight and molecular weight distribution, also referred to as dispersivity, of the resin. One method for determining these parameters is by gel permeation chromatography.

Silicone resins prepared using the present method have a low molecular weight dispersivity and are therefore useful as heat-sensitive softenable materials that exhibit a distinct glass transition point and softening point.

The present invention will be explained in greater detail by means of illustrative examples which should not be interpreted as limiting the scope of the invention defined in the accompanying claims. Unless otherwise indicated, viscosity values are measured at 25° C., Me=methyl, Ph=phenyl, Vi=vinyl, and Hex=hexenyl. The molecular weights of the silicone resins were determined by gel permeation chromatography. The glass transition points of the resins were determined using differential calorimetry and their softening points by microscopic examination.

EXAMPLE 1

A cohydrolysis reaction was conducted by dripping a solution containing 30.3 g dimethyldichlorosilane, 63.0 g diphenyldichlorosilane, 190.0 g phenyltrichlorosilane, and 85.0 g toluene into a mixture of 70 g water, 85.0 g methyl ethyl ketone, and 270 g toluene. Following the completion of this addition, the resultant reaction mixture was heated at the reflux temperature of toluene for 1 hour to complete the cohydrolysis reaction. The aqueous layer of the reaction mixture was then separated, and the toluene layer was washed with water until the wash solution tested neutral. A sample (sample A) was taken from this toluene solution of cohydrolysis reaction product.

Potassium hydroxide (0.1 g) was then added to the toluene solution of cohydrolysis reaction product, and this product was subjected to a condensation reaction by heating the reaction mixture at the boiling point until the evolution of water produced by as a by-product of the condensation reaction was no longer evident. The a sample was taken from the reaction mixture and neutralized (sample B).

Based on the solids concentration in sample B, the toluene solution of silicone resin obtained from the condensation reaction was first adjusted to a solids concentration of 65 weight % and was thereafter heated for 3 hours at the boiling point. Cooling was followed by the addition of 0.19 g trimethylchlorosilane to neutralize the reaction mixture. The toluene solution was then washed with water, and the water subsequently removed as an azeotropic mixture with toluene to yield a toluene solution of a silicone resin with the following average molecular formula (sample C).

$(Me_2SiO)_{0.17}(Ph_2SiO)_{0.18}(PhSiO_{3/2})_{0.65}$ 100 grams of sample C was diluted with toluene to give a solids concentration of 30 weight %. 0.08 g potassium hydroxide was added to the resultant solution, which was then reequilibrated by heating it for 5 hours at the reflux temperature of toluene. A sample (sample D) was subsequently taken from the toluene solution of the silicone resin product.

Toluene was then distilled from the solubilized silicone resin product to achieve a solids concentration of 65 weight %, following which the reaction mixture was heated at the reflux temperature of toluene for 5 hours. After cooling, the resultant solution was neutralized by the addition of 0.16 g trimethylchlorosilane. The toluene solution was then washed with water and the water subsequently removed as an azeotropic mixture with toluene to yield sample E.

The toluene was distilled from samples A to E, and in each case a silicone resin was obtained which was solid at room temperature. The weight average molecular weight, molecular weight dispersivity, glass transition point and softening point of the three resin samples are reported in Table 1. A plot of the molecular weight distributions of samples A B, and C appear in the accompanying drawing identified as FIG. 1.

TABLE 1

|  | Comparison Examples | | Present Invention | | |
| --- | --- | --- | --- | --- | --- |
|  | sample A | sample B | sample C | sample D | sample E |
| weight-average molecular weight | 7918 | 12020 | 2740 | 1830 | 2650 |
| molecular weight dispersivity | 3.40 | 4.40 | 1.71 | 1.62 | 1.73 |
| glass transition point (°C.) | — | 80 | 60 | 50 | 60 |
| softening point (°C.) | — | 110 | 85 | 70 | 85 |

EXAMPLE 2

A cohydrolysis reaction was conducted by dripping a solution containing 14.8 g dimethyldichlorosilane, 81.4 g phenyltrichlorosilane, and 85.0 g toluene into a solution of 70 g water, 85.0 g methyl ethyl ketone, and 270 g toluene. Following completing of the addition the reaction mixture the reaction mixture was heated at the reflux temperature of toluene for 1 hour to complete the cohydrolysis reaction. The aqueous layer was subsequently separated, and the toluene layer was washed with water until the wash solution reached neutrality. Potassium hydroxide (0.1 g) was then added to the toluene solution of silicone resin product, and the resultant mixture was subjected to a condensation reaction by heating it at the reflux temperature of toluene until the water evolved as a by-product of the reaction was no longer produced.

The resultant solution from the condensation reaction was adjusted to solids concentrations of 40, 50, and 60 weight %, and each of the resultant solutions was heated for 3 hours at the reflux temperature of toluene. After cooling 0.19 g of trimethylchlorosilane was added to neutralize each of the reaction mixtures. The toluene solutions were then washed with water and the water was subsequently removed as an azeotropic mixture with toluene to yield a toluene solutions of a silicone resin with the following average molecular formula.

$(Me_2SiO_{2/2})_{0.23}(PhSiO_{3/2})_{0.77}$

The toluene was distilled from the toluene solutions of the three silicone resin products, and in each case a silicone resin was obtained which was solid at room temperature. The molecular weights, molecular weight dispersivities, glass transition points and softening points of the resins are reported in Table 2.

TABLE 2

|  | Present Invention | | |
| --- | --- | --- | --- |
| solids content at the time of reaction (wt %) | 40 | 50 | 60 |
| weight-average molecular weight | 1980 | 2590 | 3000 |
| molecular weight dispersivity | 1.72 | 1.80 | 1.78 |
| glass transition point (°C.) | 51 | 60 | 62 |
| softening point (°C.) | 80 | 88 | 98 |

EXAMPLE 3

A cohydrolysis reaction was conducted by dripping a solution containing 7.6 g dimethyldichlorosilane, 57.6 g methyltrichlorosilane and 85.0 g toluene into a mixture of 70 g water, 85.0 g methyl ethyl ketone, and 270 g toluene. Following completion of the addition, this reaction mixture was heated at the reflux temperature of toluene for 1 hour to complete the cohydrolysis reaction. The aqueous layer was subsequently separated, and the toluene layer was washed with water until the wash solution tested neutral. Cesium hydroxide (0.1 g) was then added to the reaction mixture, and the silicone resin was subjected to a condensation reaction by heating the reaction mixture at the reflux temperature until the evolution of water was no longer evident. The solids content of the resultant reaction mixture was then adjusted to 4 weight %, and this was followed by heating for 3 hours at the reflux temperature of toluene. Cooling of the reaction mixture was followed by the addition of 0.19 g trimethylchlorosilane for the purpose of neutralization. The toluene solution was then washed with water and the water removed as a water/toluene azeotrope to yield a toluene solution of a silicone resin with the following average molecular formula.

$(Me_2SiO)_{0.1}(MeSiO_{3/2})_{0.9}$

The toluene was distilled from the solubilized silicone resin product, and a silicone resin was obtained which solid at room temperature. The silicone resin product exhibited a weight-average molecular weight of 12,000, a molecular weight dispersivity of 2.2, a glass transition point of 30° C., and a softening point of 50° C.

EXAMPLE 4

A cohydrolysis reaction was conducted by dripping a solution containing 25 g methylvinyldichlorosilane, 250 g phenyltrichlorosilane, and 85.0 g toluene into a mixture of 70 g water, 85.0 g methyl ethyl ketone, and 270 g toluene. Following completion of this addition, the reaction mixture was heated at the reflux temperature of toluene for 1 hour in order to complete the cohydrolysis reaction. The aqueous layer was then separated, and the toluene layer washed with water until the wash solution tested neutral. Potassium hydroxide (0.1 g) was then added to the toluene solution of the silicone resin product, and the resultant solution subjected to a condensation reaction by heating at the reflux temperature of the toluene until the evolution of water produced as a by-product of the condensation reaction was no longer apparent.

The solids content of the resultant silicone resin solution was then adjusted to 9 weight %, followed by heating of the solution for 3 hours at the reflux temperature of the toluene. Cooling of the reaction mixture was followed by the addition of 0.19 g trimethylchlorosilane for the purpose of neutralizing the condensation catalyst. The toluene solution was then washed with water. The water was subsequently removed as a toluene/water azeotrope to yield a toluene solution of a silicone resin with the following average molecular formula.

$(MeViSiO)_{0.13}(PhSiO_{3/2})_{0.87}$

The toluene was distilled from the solubilized silicone resin product, and the resultant silicone resin was a solid at room temperature. The resin has a weight-average molecular weight of 2,600, a molecular weight dispersivity of 1.70, a glass transition point of 65° C., a softening point of 95° C., and a vinyl content of 3.0 weight % compared with a calculated value of 3.1 weight %.

EXAMPLE 5

A cohydrolysis reaction was conducted by dropwise addition of a solution containing 24.6 g methylhexenyldichlorosilane, 79.3 g phenyltrichlorosilane and 85.0 g toluene to a mixture of 70 g water, 85.0 g methyl ethyl ketone, and 270 g toluene. Following completion of this addition, the resultant reaction mixture was heated at the reflux temperature of the toluene for 1 hour to complete the cohydrolysis reaction. The aqueous layer was then separated, and the toluene layer was washed with water until the wash solution tested neutral.

Potassium hydroxide (0.1 g) was then added to the resultant toluene solution, and the silicone resin was subjected to a condensation reaction by heating the reaction mixture at the reflux temperature of the toluene until evolution of the water produced as a by-product of the condensation reaction was no longer apparent. The solids content of the resin solution was then adjusted to 50 weight %, followed by heating of the reaction mixture for 3 hours at the reflux temperature of the toluene. Cooling of the reaction mixture was followed by addition of 0.19 g of trimethylchlorosilane to neutralize the reaction mixture. The toluene solution was then washed with water and the water was subsequently removed as a toluene/water azeotrope to yield a toluene solution of a silicone resin with the following average molecular formula.

$(MeHexSiO)_{0.25}(PhSiO_{3/2})_{0.75}$

The toluene was distilled from the toluene solution of the silicone resin product, and the resultant resin was a solid at room temperature. The weight-average molecular weight of the resin was 2,700, its molecular weight dispersivity was 1.79, the glass transition point was 65° C., the softening point was 90° C., the hexenyl content was 5.0 weight %, compared to a calculated value of 5.1 weight %.

EXAMPLE 6

A cohydrolysis reaction was conducted by the dropwise addition of a solution containing 85.0 g toluene, dimethyldichlorosilane, methylvinyldichlorosilane, and phenyltrichlorosilane (quantities reported in Table 3) into a mixture of 70 g water, 85.0 g methyl ethyl ketone, and 270 g toluene. Following completion of this address, this reaction mixture was heated at the reflux temperature of the toluene for 1 hour in order to complete the cohydrolysis reaction. The aqueous layer was subsequently separated, and the toluene layer was washed with water until the wash solution tested neutral. Cesium hydroxide (0.01 g) was then added to the resultant toluene solution, and the silicone resin was condensed by heating the solution at the reflux temperature until evolution of the water generated as a by-product of the condensation reaction was no longer evident. The toluene solution of silicone resin was adjusted to a solids concentration of 50 weight %, and this solution was heated for 3 hours at the reflux temperature of toluene. Cooling of the reaction mixture was followed by the addition of 0.19 g trimethylchlorosilane to neutralize the condensation catalyst. The toluene solution was then washed with water. The water was then removed by azeotropic distillation with the toluene to yield a toluene solution of silicone resin. The toluene was distilled from the toluene solution of silicone resin product, and in each case a silicone resin was obtained which was a liquid at room temperature. The molecular weights, and glass transition temperatures of the resins, all of which are within the scope of the present invention are reported in Table 3.

TABLE 3

| Quantities of initial silanes (g) | | | |
|---|---|---|---|
| phenyltrichlorosilane | 84.6 | 63.5 | 42.3 |
| dimethyldichlorosilane | 51.6 | 64.5 | 77.4 |
| methylvinyldichlorosilane | 28.2 | 28.2 | 28.2 |
| weight-average molecular weight | 5840 | 5420 | 4960 |
| molecular weight dispersivity | 2.62 | 2.44 | 2.48 |
| viscosity (centistokes)* | 31,200 | 2,710 | 640 |
| glass transition point (°C.) | −40 | −70 | −90 |

That which is claimed is:

1. A method for preparing an organosiloxane resin, said method consisting essentially of the sequential steps of (1) cohydrolyzing (a) an organotrihalosilane of the general formula $R^1SiX_3$ and a diorganodihalosilane of the general formula $R^2_2SiX_2$ in an aqueous medium, (2) subjecting the resulting hydrolysis product to a condensation reaction, (3) subsequently adjusting the solids concentration in the reaction mixture within the range from 0.1 to 90 weight percent, based on the weight of said mixture, and (4) subjecting the resultant mixture to an alkali metal-catalyzed re-equilibration reaction, where $R^1$ and $R^2$ are individually selected from the group consisting of substituted and unsubstituted monovalent hydrocarbon radicals and X represents a halogen atom.

2. The method of claim 1 in which the alkali metal catalyst is a potassium or cesium compound, $R^1$ and $R^2$ are individually selected from the group consisting of methyl and phenyl and X is chlorine, said aqueous medium contains at least one organic liquid, at least the latter portion of the cohydrolysis reaction is conducted at the reflux temperature of the reaction mixture, the hydrogen halide generated as a by-product of the cohydrolysis is removed from the reaction mixture, the condensation reaction is conducted in the presence of an acid or base catalyst, the solids content is adjusted to from 5 to 90 weight percent, and the re-equilibration reaction is conducted at the reflux temperature of the reaction mixture.

3. The method of claim 2 where said compound is a hydroxide or a silanolate, said organic liquid is toluene and at least one member selected from water miscible alcohols and water miscible ketones, and the concentration of the catalyst for the equilibration reaction is at least 100 parts per million by weight, based on the weight of the reaction mixture.

* * * * *